UNITED STATES PATENT OFFICE.

NARCISSE PIGEON AND WILLIAM L. FLANAGAN, OF NEW YORK, N. Y.

PROCESS OF MANUFACTURING ALE, BEER, AND PORTER.

SPECIFICATION forming part of Letters Patent No. 339,686, dated April 13, 1886.

Application filed November 11, 1885. Serial No. 182,480. (No specimens.)

*To all whom it may concern:*

Be it known that we, NARCISSE PIGEON and WILLIAM L. FLANAGAN, both citizens of the United States, residing in the city, county, and State of New York, have invented certain new and useful Improvements in Process of Manufacturing Ale, Beer, and Porter; and we do hereby declare that the following is a full, clear, and exact description of the invention, which will enable others skilled in the art to which it appertains to make and use the same.

By the methods heretofore generally employed in the manufacture of ale, beer, and porter the barley is first converted into malt, from which, by mashing the same with water, an extract of malt is formed, which constitutes the well-known malt "wort" of the breweries. The malting operation is always attended with a considerable loss of the valuable properties of the grain, and this, together with the time, fuel, and labor consumed in converting the grain into malt, constitute large items of expense in the manufacture of malt-liquors.

The object of our invention is to obtain from barley during the brewing process a wort equivalent to malt-wort without subjecting a considerable proportion of the barley to a preliminary malting operation; also, to extract from grain in the manufacture of malt-liquors the maximum of valuable material for this purpose during brewing process, which will amount to about five per centum over that obtained by the ordinary mash-tun process.

Our invention relates especially to that step in the manufacture of malt-liquors known as the "mashing" operation, in which the malt is mixed with water and heated to the proper temperature and during the proper time to form the wort.

In carrying out our invention we prefer to use a water-bath converter substantially like that described and shown in Letters Patent No. 203,935, granted to Narcisse Pigeon, May 21, 1878, which consists in the main of an interior vessel or chamber surrounded by a water-jacket and provided with proper agitators, the construction and operation being such that the temperature of the liquid contents of the interior vessel can be varied by increasing or decreasing the temperature of the water in the jacket by injecting steam, or by steam-coils placed therein. In connection with the converter straining-tubs of usual construction, except that they are preferably furnished with false bottoms of woven wire, are employed. These appliances are so well-known in the art of brewing that no further description of their construction and use is necessary.

When barley is employed for mashing with malt in the converter, it should be thoroughly cleaned by some of the usual means, as a grain-separator, or combined brush-polisher, or other efficient cleaning apparatus, by which it is freed from dirt, dust, and impurities known as "disease ferments." The requisite quantity of water, which should be about three times the weight of all the grain used, including both the barley and malt, is first pumped into the converter, and the barley and malt are then added, preferably, as follows: Suppose about seventeen thousand pounds of barley and malt taken together are to be used in the mash, of which about eight thousand five hundred pounds are barley and about eight thousand five hundred pounds are malt. Of this amount of malt preferably about two thousand five hundred and fifty pounds, or an amount of malt equal to about thirty per centum of the barley, are to be used in the converter for the preliminary preparation of the mash, the remainder, about five thousand nine hundred and fifty pounds, being withheld for addition at the proper times, for the purpose of completing the process, as will be hereinafter fully explained. The water or sweet water, as the case may be, in the converter is brought to a temperature of about 145° Fahrenheit. The barley, cleaned as above described and ground fine, and about twelve hundred and fifty pounds of malt are slowly and uniformly introduced into the converter, the agitators being kept running to thoroughly mix the barley and malt with the water and with each other. The temperature of the mash thus formed is gradually brought up to about 154° Fahrenheit, and then about six hundred and fifty pounds more of malt are added to the mash. The temperature is still further gradually raised to about 160°, and an additional six hundred and fifty pounds of malt are added. The mash is now very gradually heated to a slightly-higher temperature—say to about 162° to 166°—and is kept at near that heat until complete exfoliation takes place. It is preferred that from thirty to sixty minutes should elapse between the introduction of the quantities of malt above named, and that the temperature of the mash should be gradually increased during the most of that time. It is important, if not absolutely essential, to produce the required results at temperatures sufficiently low as not to injure the mash to add the malt in fractional quantities and at different times, in order that the diastase which is released from each addition of malt by the heated bath may act successively upon the barley to effect complete exfoliation and liquefaction. The efficiency of the introduction of the malt in fractional quantities to produce complete exfoliation of the grain and render the starchy matter soluble is ascribed to the somewhat peculiar action of diastase upon grain at low temperatures—in this respect, that a reasonably-small quantity added to the mash at a single time will do substantially the same amount of work in the particulars named as a much larger quantity added at a single time, and that consequently a given quantity of diastase is far more efficient to accomplish the desired results when caused to act upon the grain in the mash during different intervals of time than during a single interval. Whether the above explanation is in all particulars correct or not, it is, however, true that the addition of the malt in fractional quantities and under conditions named during the preliminary preparation of the mash will produce the desired exfoliation and liquefaction of the grain at temperatures which will not injure the mash. By the employment of this method high temperatures, with their injurious results, are avoided, the diastase of the malt used can be fully utilized to effect complete exfoliation, while the larger proportion of the malt can be retained or withheld for the subsequent operation of saccharification. In carrying out this process the spent wort or sweet water containing certain salts and albuminoids assist in producing exfoliation, and should be used in all cases where it is practicable. After complete exfoliation and liquefaction has been produced, as above described, the mash is cooled down to about 145° to 150°, preferably by running cold water into the jacket-space, at which temperature the balance of the malt is added, (in the case supposed about five thousand nine hundred and fifty pounds,) which will bring the initial heat of saccharification to from 140° to 147°. The temperature is then gradually raised, preferably during from one to two hours, till it reaches about 160° to 164°, when the wort is finished, and the entire mass is then dropped into strainers, where it should stand for about thirty minutes.

In the case above supposed for the purpose of illustration, equal quantities of barley and malt are taken. It is not, however, intended thereby to limit our invention to these special proportions. We know that by adding the malt in fractional quantities, aggregating about thirty per cent. in weight of the barley used, and treating the mash substantially as set forth the barley will be completely exfoliated and the mash will be in the proper condition to receive the subsequent treatment to produce the desired wort. More than thirty per centum of malt could be used in this preliminary process, but it is unnecessary and would be useless. Less than that quantity would undoubtedly produce fair results, with the liability, however, of incomplete exfoliation. We do not consider it necessary after the barley has been completely exfoliated to add barley-malt to the full amount of seventy per centum of the barley used for the purpose of saccharification or conversion, as considerably less than that proportion will under many, or at least some, conditions give good results. In such case the quantity of malt which would be displaced or dispensed with in this process as compared with the common process, where malt alone is used, would be more than fifty per centum.

It is here remarked that "exfoliation" as used in this specification relates to the bursting and disintegration of the starch-cells of the barley, and is produced by the sudden expansion and liquefaction of the contained starch under the action of the diastase which penetrates the cells. We do not understand that the starch is gelatinized in the sense in which that word is commonly understood, but that it is released from its cells and is taken into solution by the water of the mash.

As the times at which certain steps of the above-described process should be taken, as well as the temperatures of the mash at and between such times are regarded as important to obtain the best results, we give below a tabulated statement of working information which we have deduced from careful and successful practice. In this table the left-hand column (marked "Times") refers to the hour and minutes at which the steps and conditions named in the right-hand column (marked "Remarks") were taken or existed. The columns marked "Outside" and "Inside," respectively, give the temperature in degrees (Fahrenheit) of the water in the jacket-space by which the mash is heated and cooled and the temperature of the mash itself during the several times named in the left-hand column, as follows:

| Times. | Outside. | Inside. | Remarks. |
|---|---|---|---|
| 5.00 | 145° | 145° | Water, barley, and first malt-steam outside. |
| 5.25 | 154° | 143° | Covers on converter. |
| 6.00 | 166° | 154° | Second malt put in. |
| 6.50 | 168° | 160° | Third malt put in. Steam turned off. |
| 7.20 | 164° | 162° | Covers off. Cold water outside. |
| 7.50 | 104° | 154° | Water turned off outside. |
| 8.10 | 116° | 150° | Fourth malt put in. Steam turned on. |
| 8.40 | 152° | 146° | Covers on. Steam turned off. |
| 9.20 | 162° | 154° | Steaming slowly outside. |
| 10.30 | 166° | 160° | Steam turned off and mash dropped. |

In giving the above table we wish it understood that we do not limit our invention to the specific times and temperatures therein set forth; nor do we, in referring to the fractional proportions of malt to be added to the grain, limit ourselves to the exact proportions named, since we are aware that fair results can be obtained by the use of somewhat different proportions added at different times and at different temperatures from those given in the said table. After the mash has been dropped from the converter into the strainers, and when the upper liquid is nearing the solid in the strainers, the mash is sparged with water to exhaust its value. When by this operation the wort becomes too weak for boiling, it is pumped back into the converter as "sweet water," and is available for the next mashing operation. Great care should be taken that the temperature of this weak wort or sweet water does not fall below 150° Fahrenheit, lest it be ruined or injured by the formation of lactic acid or other chemical changes. If it is kept at the temperature named, it will remain sound and in good condition for a considerable time. On the other hand, it must not be raised to a very high temperature, as this would tend to produce an undue coagulation of albuminoids. When the next mashing is about to begin, the sweet water is cooled down to about 145°, as given in the foregoing table.

By the above-described method ordinary barley introduced into the converter in an unmalted state is evidently converted into the equivalent of barley-malt, and within five or six hours' time a wort is produced which is in all substantial respects for the purpose of making malt liquors the equivalent of the ordinary malt-wort. The identity of the wort so produced to malt-wort is so complete that glucose, grape-sugar, and other similar articles, which are largely employed to give body to the ordinary malt-wort, can, if desired, be added to this wort in the same way and with the same results. By this method, as above described, the malting of at least fifty per cent. of the barley before it is subjected to the mashing operation is unnecessary, and the cost in time, fuel, labor, and store-room to convert that proportion of the grain into malt, as well as the loss in valuable wort-making properties incurred in such preliminary malting are saved. In other words, the barley introduced into the converter as barley can be made by this method of treatment to take place of as much or more than fifty per centum of barley malt in the ordinary methods of brewing malt-liquors.

After the wort has been produced by the process above described it may be treated in all substantial respects in the subsequent operations of brewing as the ordinary malt-wort is treated.

Any of the known and common methods and appliances for boiling, hopping, or flavoring with hops or other materials, cooling, fermenting, racking, and storage may be employed with equal advantage and effect.

What we claim as new is—

1. The herein-described process of preparing barley for use in the manufacture of ale, beer, and porter, which consists in mashing the barley with barley-malt, the latter being added in fractional quantities and at different times, and the mash being kept at proper temperatures during the process, substantially as set forth, whereby the barley will be exfoliated at uninjurious temperatures, and the mash prepared for conversion into wort by subsequent treatment, substantially as described.

2. The herein-described process of producing a wort for the manufacture of ale, beer, and porter, which consists in mashing barley with barley-malt, the latter being added to the mash in fractional quantities and at different times, substantially as set forth, whereby the barley is exfoliated at low and harmless temperatures, and then introducing into the mash thus prepared an additional quantity of malt for saccharification, and continuing the mashing substantially as set forth, whereby fifty per centum or more of barley-malt as used in the common process is dispensed with and ordinary barley is substituted therefor, and a wort is produced substantially the equivalent of if not identical with the wort produced wholly from barley-malt.

NARCISSE PIGEON.
WILLIAM L. FLANAGAN.

Witnesses:
JAMES A. McDOWELL,
JOSEPH CORLIT.